United States Patent [19]

Wahl

[11] Patent Number: 4,856,888
[45] Date of Patent: Aug. 15, 1989

[54] ADJUSTABLE TELESCOPING MIRRORS

[75] Inventor: John F. Wahl, Sterling, Ill.

[73] Assignee: Wahl Clipper Corporation, Sterling, Ill.

[21] Appl. No.: 145,056

[22] Filed: Jan. 19, 1988

[51] Int. Cl.⁴ .......................... G02B 7/18; G02B 5/08
[52] U.S. Cl. .................................. 350/639; 350/621; 248/467
[58] Field of Search ............... 350/621, 624, 623, 618, 350/631, 640, 639; 248/467, 480

[56] References Cited

U.S. PATENT DOCUMENTS

| | | |
|---|---|---|
| 816,588 | 4/1906 | Moore . |
| 858,964 | 7/1907 | Dayton et al. . |
| 918,724 | 4/1909 | Austin . |
| 970,636 | 9/1910 | Miller . |
| 1,006,315 | 10/1911 | Toth . |
| 2,091,203 | 8/1937 | Hay . |
| 2,668,477 | 2/1954 | Shaikun . |
| 2,690,094 | 9/1954 | Becker . |
| 2,880,651 | 4/1959 | Fenyo . |
| 2,915,944 | 12/1959 | Butts . |
| 2,995,983 | 8/1961 | Davis . |
| 3,205,777 | 9/1965 | Brenner . |
| 3,392,950 | 7/1968 | Pierce . |
| 3,708,218 | 1/1973 | Smillie ............................ 248/467 |
| 3,730,612 | 5/1973 | Arroyo et al. . |
| 3,781,093 | 12/1973 | Grabijas . |
| 4,039,818 | 8/1977 | Hickman . |
| 4,529,278 | 7/1985 | Nugent .......................... 248/467 |
| 4,603,944 | 8/1986 | Greenlaw et al. . |
| 4,614,412 | 9/1986 | Cohen . |

FOREIGN PATENT DOCUMENTS

| | | | |
|---|---|---|---|
| 2263776 | 7/1974 | Fed. Rep. of Germany ...... 350/621 |
| 807158 | 1/1937 | France .............................. 248/467 |
| 925866 | 9/1947 | France .............................. 350/621 |
| 158401 | 1/1921 | United Kingdom ............... 248/467 |

*Primary Examiner*—Jon W. Henry
*Attorney, Agent, or Firm*—Welsh & Katz, Ltd.

[57] ABSTRACT

An adjustable telescoping mirror is disclosed which may be secured to a surface such as a wall or mirror secured to a wall. The adjustable mirror includes a base having four suction cups arranged in two rows which are parallel to the ground when the base is secured to the wall. A telescoping rod is secured to the base by a first coupling which is located below the suction cups when the base is secured to the wall. The mirror is secured to the other end of the telescoping rod by a second coupling. The couplings have sufficient friction to support the weight of the mirror when it is extended and placed in a desired location, but do not prevent the user from easily moving the mirror as desired. The two rows of suction cups, and their locations above the first coupling, resist forces created by the mirror when it is extended which tend to pull the mirror away from the wall. The location of the first coupling is close to the lower edge of the base so that the device is compact when contracted and folded.

3 Claims, 2 Drawing Sheets

ADJUSTABLE TELESCOPING MIRRORS

This invention relates to adjustable mirrors, and more particularly, to adjustable telescoping mirrors which include a base which may be secured to a wall or a wall-mounted mirror through the use of four or more suction cups. The suction cups and mirror are arranged on the base to reduce the size of the device when it is folded for carrying, shipping or storage, and to increase the ability of the suction cups to maintain the base on the wall when the mirror is extended.

BACKGROUND OF THE INVENTION

Known adjustable telescoping mirrors include a base which may be secured to another mirror mounted on a wall, or to the wall itself. When the base is so mounted, the adjustable mirror may be extended through the use of a telescoping rod and adjusted as desired. The adjustable mirror and base are relatively small so that when the telescoping rod is contracted, the mirror and base can be folded so that they are parallel and overlap somewhat. When the telescoping rod is fully extended, the mirror is separated from the base by a distance which is several times the diameter or width of the base.

In known devices, the base is secured to the wall through the use of three or fewer suction cups. When the base is secured to the wall in this manner, the mirror may be extended away from the wall and the base by extending the telescoping rod, and may be placed at various angles with respect to the wall. The telescoping rod is secured to the center of the base so that resistance to torque created by the extended mirror is substantially equal in all directions around the base. However, since the base is relatively small, the resistance to torque in any direction, and particularly in the downward direction, is also relatively small.

Extension of the adjustable mirror in the manner described creates torque on the suction cups which tends to pull the cups away from the wall. Since the base is small compared with the length of the extended telescoping rod, and the rod is secured to the center of the base, the torque placed on the suction cups by the telescoping rod and mirror can be substantial, particularly in the downward direction. Substantial forces are also placed on the suction cups when the mirror is being moved by the user. If such torque and forces are sufficient, the base and mirror can be pulled from the wall, which is undesirable. Thus, there is a need for adjustable telescoping mirrors having a relatively small base which resists relatively substantial downward forces created by extending and moving the mirror.

Another problem with known adjustable telescoping mirrors is that the devices are not compact when the telescoping rod is contracted, which is undesirable for both shipping and storage. Thus, there is also a need for adjustable telescoping mirrors which are compact when contracted and folded for shipping or storage.

Accordingly, one object of this invention is to provide new and improved adjustable telescoping mirrors.

Another object is to provide new and improved adjustable telescoping mirrors which have a relatively small base and resist substantial downward forces created by the mirror when it is extended.

Yet another object is to provide new and improved adjustable telescoping mirrors which have a relatively small base and resist substantial forces created by extending and moving the mirror.

A still further object is to provide new and improved adjustable telescoping mirrors which are compact when folded for shipping or storage.

SUMMARY OF THE INVENTION

In keeping with one aspect of this invention, an adjustable telescoping mirror may be secured to a surface such as a wall, a wall-mounted mirror or the like which is vertical with respect to the ground. The adjustable mirror includes a base having an underside surface adapted to face towards the wall, an outside surface adapted to face away from the wall, and a lower edge which faces toward the ground when the base is secured to the wall.

Four or more suction cups are secured to the underside surface of the base. The cups each have a round, flexible, concave dish disposed away from the underside of the base for securement to the wall, and securing means at the apexes of the dishes. The apexes are secured to the underside of the base. In a four suction cup configuration, the cups are arranged in two rows, each row having two cups arranged in a line which is substantially parallel to the ground when the cups are secured to the wall.

A first coupling is secured adjacent to the outside surface of the base a selected distance between the lower edge of the base and the center of the base. The two rows of cups are located above the first coupling when the base is secured to the wall.

One end of a telescoping rod is secured to the first coupling, and a mirror is secured to the other end of the telescoping rod by a second coupling. The first and second couplings have sufficient friction to hold the mirror in place when it is extended and placed in a desired position, but do not prevent the user from easily moving the mirror as desired. However, the four suction cups and their locations above the first coupling resist the downward torque created by the mirror when it is extended which tends to pull the mirror away from the wall.

The first coupling is located near enough to the lower edge of the base so that when the telescoping rod is contracted, it may be folded down over the base and the mirror may also be folded over to substantially cover the base. In this manner, the device is compact for shipping and storage.

BRIEF DESCRIPTION OF THE DRAWINGS

The above-mentioned and other features of this invention and the manner of obtaining them will become more apparent and the invention itself will be best understood by reference to the following description, taken in conjunction with the accompanying drawings, in which.

DETAILED DESCRIPTION OF THE INVENTION

Figure 1:
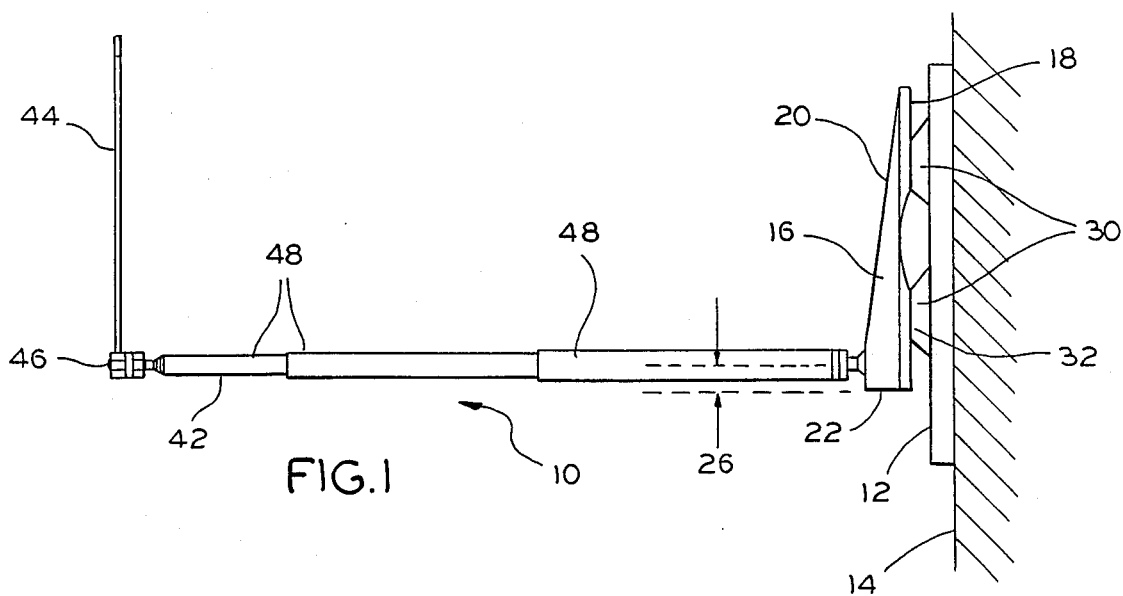
FIG. 1 is a side elevation view of adjustable telescoping mirror apparatus made in accordance with this invention.

As seen in the drawings, an adjustable telescoping mirror apparatus 10 (FIG. 1) is secured to another mirror 12. The mirror 12 is secured to a wall 14 or other surface which is substantially vertical with respect to the ground.

The mirror device 10 includes a base 16 (FIG. 2) having an underside surface 18 which is adapted to face towards the mirror 12 and wall 14, and an outside surface 20 (FIG. 3) which is adapted to face away from the wall 14. The base 16 also has a lower edge 22 (FIG. 1) which faces towards the ground when the base 16 is secured to the wall 14.

A first coupling 24 is secured to the outside surface 20 of the base 16 a distance 26 from the lower edge 22. The coupling 24 is below a center line 28 of the base 16, and is preferably substantially below the line 28, as shown in FIGS. 2 and 3.

Figure 2:
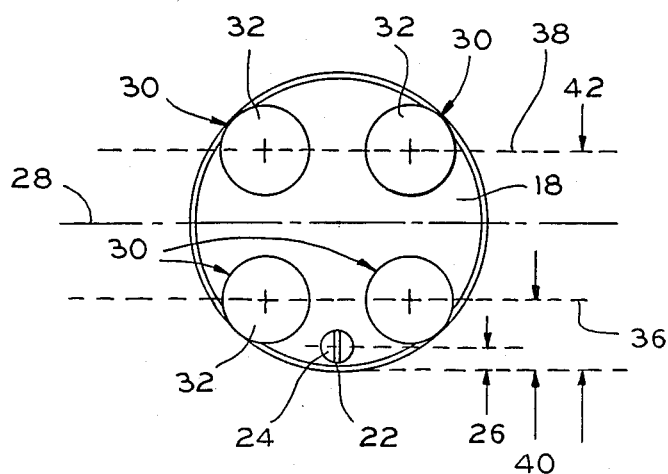
FIG. 2 is an elevation view of the underside surface of the base of the adjustable mirror of FIG. 1.

As seen in FIG. 2, four suction cups 30 are secured to the underside surface 18 of the base 16. The suction cups 30 each have a round, flexible, concave dish 32 disposed away from the underside surface 18 of the base 16 for securement to the wall 14, and tips 34 (FIG. 3) or some other securing device at the apexes or centers of the cups 30. The tips 34 are disposed towards and secured to the underside surface 18 of the base 16 in orifices in the base 16 or through the use of other suitable structure.

Figure 3:
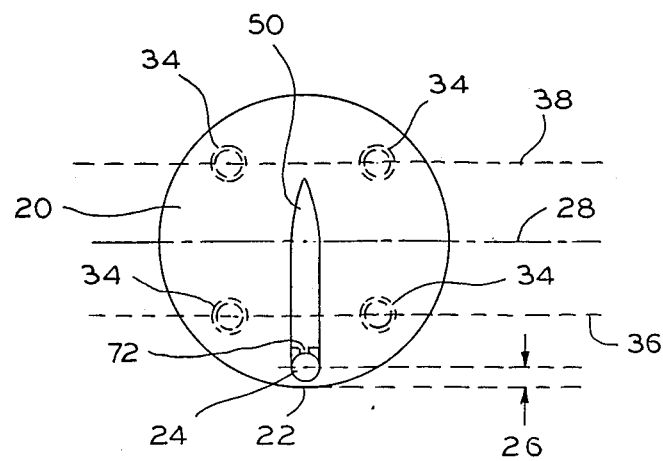
FIG. 3 is an elevation view of the outer surface of the base of the adjustable mirror of FIG. 1.

The four suction cups 30 are arranged in two rows 36, 38 (FIGS. 2 and 3). The rows 36, 38 each have two cups 30, and each row 36, 38 is arranged in a line which is substantially parallel to the ground when the cups 30 are secured to the wall 16. The row 36 is located a distance 40 from the lower edge 22 which is greater than the distance 26, but the row 36 is also below the center line 28. The row 38 is located a distance 42 from the lower edge 22 which is also greater than the distance 26, and is above the center line 28.

One end of a telescoping rod 42 is secured to the first coupling 24, and a mirror 44 is secured to the other end of the rod 42 by a second coupling 46. The rod 42 includes a plurality of interfitting tubes 48 which may be extended, as in FIG. 1, or contracted within each other, as in FIG. 4. Three tubes 48 are shown in the rod 42 in FIG. 1, although more or fewer tubes can be used, provided that the mirror 44 can be extended an acceptable distance from the base 16. An acceptable distance allows the user to place the mirror behind the head to view the back of the head in the mirror 44 of the wall mirror 12. About 24 to 30 inches is considered acceptable.

Figure 4:
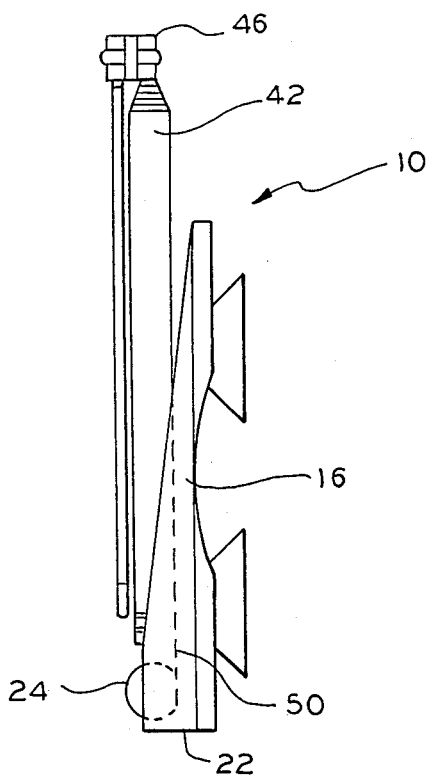
FIG. 4 is a side view of the adjustable mirror of FIG. 1, shown with the telescoping rod contracted.
Figure 5:
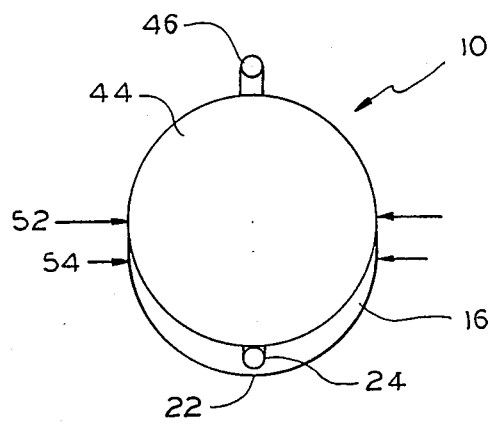
FIG. 5 is a front view of the adjustable mirror of FIG. 1, shown with the telescoping rod contracted.

When the telescope 42 is contracted, the apparatus 10 may be folded into a compact package for easy carrying, shipping and storage, as seen in FIGS. 4 and 5. The outside surface 20 of the base 16 is tapered from the lower edge 22 to the top of the base, with the thickest portion of the base being adjacent to the lower edge 22. A depression 50 (FIGS. 3 and 4) is provided in the outside surface 20 so that the telescope 42 can be folded substantially flush with the base 16. In addition, the first coupling 24 is a ball and socket joint which permits the telescope to be folded in this manner. When so folded, the mirror 44 and the base 16 substantially overlap so that the device is compact for shipping or storage.

The second coupling 46 is a double ball and socket joint which permits the mirror 44 to be folded over adjacent to the base 16 for shipping and storage, in the manner shown in FIGS. 4 and 5. The diameters 52, 54 of the mirror 44 and base 16, respectively, are relatively equal and both are small enough to permit easy storage, as well. A typical diameter is about 4 to 6 inches. Thus, the diameters 52, 54 are significantly less than the length of the telescoping rod 42 when extended. A base diameter which is about 13% to 17% of the fully extended length of the telescoping rod 42 is preferred. The mirror diameter is preferably the same as the base diameter thus providing adequate view field and also the most compact collapsed package.

Figure 6:
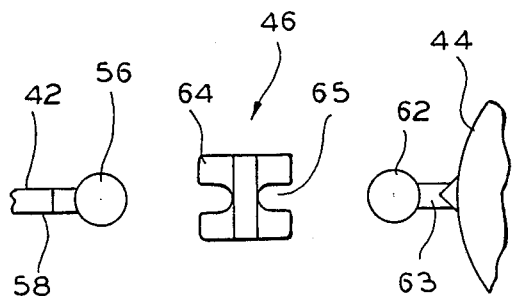
FIG. 6 is an exploded view of a coupling of the apparatus of FIG. 1.

The second coupling 46 is shown in greater detail in FIG. 6. The coupling 46 includes a ball 56 on a stem 58 which is part of the telescoping rod 42, and a double socket 60. A second ball 62 is attached to a second stem 63 on the mirror 44. The first ball 56 and the second ball 62 are secured in the socket 60 during use for rotational and radial movement. The sockets in the double socket 60 include a plurality of spaced fingers 64 which create spaces 65 which are wide enough so that the stems 58, 63 can fit into them for maximum movement of the telescoping rod 42 and mirror 44.

Figure 7:
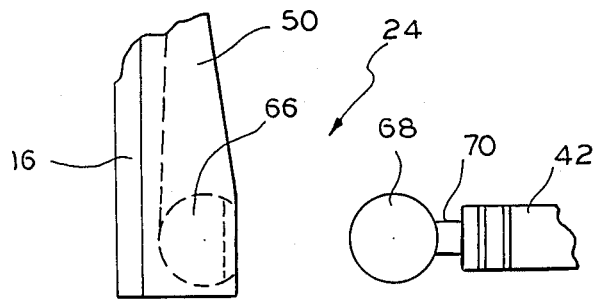
FIG. 7 is an exploded view of a second coupling of the apparatus of FIG. 1.

The first coupling 24 is shown in greater detail in FIG. 7. The coupling 24 includes a socket 66 in the base 16 and a ball 68 secured to a stem 70 which is attached to the telescoping rod 42. The ball 68 fits snugly inside of the socket 66 for rotational movement therein. The socket 66 includes a slot 72 (FIG. 3) into which the stem 70 fits so that the telescoping rod 42 can be folded substantially flush with the base 16 for shipping and storage, as previously described.

The diameter of the base 16 is preferably about 13% to 17% of the fully extended length of the telescoping rod 42, and the distance between the first coupling 24 and the line 38, which is the furthest removed from the coupling 24, is preferably about 9% to 11% of the fully extended length of the telescoping rod 42. Furthermore, the distance between the first coupling 24 and the line 36 is preferably about 30% to 35% of the distance between the lines 36 and 38, and the distance 26 is about 8% to 12% of the diameter of the base 16. With these relative dimensions, the base 16 is relatively small for purposes of shipping and storage, but the resistance to torque created by the distance between the base coupling 24 and the suction cups furthest from the base coupling is sufficient to easily maintain the apparatus on the wall or wall mirror even when the mirror is fully extended.

In apparatus actually made, the diameter of the base was about 4.75 inches and the diameter of the mirror was also about 4.75 inches. The telescoping rod was about 5 inches long when contracted, and about 29 inches long when extended. The distance 26 between the lower edge 22 and the first coupling 24 was about 0.375 inches, the distance 40 between the edge 22 and the line 36 was about 1.125 inches, and the distance 42 between the edge 22 and the line 38 was about 3.5 inches. Thus, the diameter of the base was about 16% of the fully extended length of the telescoping rod, and the distance between the base coupling and the line formed by the suction cups furthest away from the base coupling was about 12% of the fully extended length of the telescoping rod.

In use, the base 16 is pressed against a wall or wall-mounted mirror so that the suction cups adhere to the surface. The mirror 44 may then be placed in a desired position by extending the telescoping rod. The couplings allow the user to place the mirror in any of a variety of positions. When not in use, the telescoping rod can be contracted and folded close to the wall or wall mirror, or the entire apparatus can be folded, removed from the wall or wall mirror and stored.

The use of four suction cups and the location of the coupling on the base near the lower edge of the base increases the resistance to torque of the suction cups against forces created by the torque load of the mirror when it is extended.

The advantages of this invention are now apparent. The adjustable telescoping mirror has a relatively small base which resists substantial downward forces created by the mirror when it is extended, and when it is moved, yet the apparatus is compact when the telescoping rod is contracted for shipping and storage.

While the principles of the invention have been described above in connection with specific apparatus and applications, it is to be understood that this description is made only by way of example and not as a limitation on the scope of the invention.

I claim:

1. Portable adjustable mirror apparatus which may be removably secured to a surface comprising
    a base having an underside surface, an outside surface, an outer edge, a first center line passing through the center of said base, and a second center line passing through the center of said base perpendicular to said first center line;
    a first coupling permanently secured to said outside surface of said base along said first center line, said first coupling being a first selected distance away from said edge, said first distance being less than the distance from said edge to the center of said base;
    a plurality of suction cups secured to said underside surface of said base, at least two of said suction cups being on opposite sides of said second center line;
    a telescoping rod having two ends, said first end being secured to said first coupling; and
    a mirror secured to said second end of said telescope by a second coupling, said second coupling being adjacent an edge of said mirror;
    whereby said telescoping rod may be collapsed and said mirror may be compactly folded over on top of said base for shipment or storage.

2. The apparatus of claim 1 comprising four of said cups.

3. The apparatus of claim 2 wherein said four suction cups are mounted near said edge of said base and are arranged in two rows which are substantially parallel to said second center line, each of said rows having two of said suction cups.

* * * * *